(12) United States Patent
Choi

(10) Patent No.: US 7,443,795 B2
(45) Date of Patent: Oct. 28, 2008

(54) DATA TRANSMISSION CONTROL METHOD FOR GPRS

(75) Inventor: Sung-Kyu Choi, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 846 days.

(21) Appl. No.: 10/438,032

(22) Filed: May 15, 2003

(65) Prior Publication Data

US 2003/0217318 A1     Nov. 20, 2003

(30) Foreign Application Priority Data

May 15, 2002    (KR)    ................... 10-2002-0026822

(51) Int. Cl.
*H04L 12/26*    (2006.01)
*H04J 3/14*    (2006.01)
(52) U.S. Cl. .................... 370/235; 370/236.1
(58) Field of Classification Search .......... 370/229–238; 714/750
See application file for complete search history.

(56) References Cited

U.S. PATENT DOCUMENTS

| 6,570,848 | B1 * | 5/2003 | Loughran et al. | 370/230.1 |
| 6,628,613 | B1 * | 9/2003 | Joung et al. | 370/230 |
| 6,690,520 | B1 * | 2/2004 | Kusuzawa | 359/740 |
| 2004/0001435 | A1 * | 1/2004 | Wong | 370/230 |

OTHER PUBLICATIONS

"Digital Celluar Telecommunications System (Phase 2+); General Packet Radio Service (GPRS); Mobile Station (MS)-Base Station System (BSS) Interface; Radio Linke Controumedium Access Control (RLCIMAC) Protocol," GSM 04.60 version 8.14.1 Release 1999, ETSI TS 101 349, V8.14.1, 2002, pp. 85-124.*

"Digital Celluar Telecommunications System (Phase 2+); General PacketRadio Service (GPRS); Mobile Station (MS)-Base Station System (BSS)Interface; Radio Linke Controumedium Access Control (RLCIMAC)Protocol," GSM 04.60 version 8.14.1 Release 1999, ETSI TS 101 349, V8.14.1, 2002, pp. 85-124.*

Ajib et al., "Acknowlegement Operations in the RLC Layer of GPRS," Mobile Multimedia Communications, 1999 IEEE International, pp. 311-317.

* cited by examiner

*Primary Examiner*—Seema S. Rao
*Assistant Examiner*—Mon Cheri S Davenport
(74) *Attorney, Agent, or Firm*—Ked & Associates, LLP

(57) ABSTRACT

A data transmission method of a GPRS includes estimating a possibility of an impending stall state of a transmit window, transmitting a stall state alarm signal of the transmit window to a network if it is predicted that the stall state of the transmit window is approaching, and controlling data transmissions according to whether an ACK signal for the stall state alarm signal is received or not from the network. Notification of the possibility of the stall state of the transmit window is provided at least once and preferably twice to the network before stall actually occurs, thereby reducing the number of occurrences of the transmit window's stall state. As a result, waste of network resources due to re-transmission performed in the stall state is minimized.

19 Claims, 3 Drawing Sheets

DATA TRANSMISSION CONTROL METHOD FOR GPRS

BACKGROUND OF THE INVENTION

1. Field of the Invention

The present invention relates to a General Packet Radio System (GPRS) and more particularly to a data transmission method in the GPRS.

2. Background of the Related Art

A GPRS is an overlay network system implemented on a global system for mobile communications (GSM) network, which is a circuit switching-based two-generation radio communication network standard adapted by GPRS for packet data transmissions. In order to transmit packet-based data on the GSM network, a fresh network factor, an interface, and a protocol are required to process packet traffic.

The GPRS is logically implemented by adding two network nodes as core network (CN) factors of the GSM. The first node is a serving GPRS Support Node (SGSN) and the second node is a gateway GPRS Support Node (GGSN). In addition to these nodes, a packet control unit (PCU) for processing a packet traffic should be installed in a base station controller (BSC), and software upgrading should also be performed.

In the GPRS system constructed as described above, voice or data traffic transmitted from a GPRS terminal is transmitted to a BTS through an air interface and then transmitted from the BTS to the BSC in the same manner. However, at the output side of the BSC, the traffic is divided into voice traffic which is transmitted to a mobile switching center (MSC) as standard GSM traffic and data traffic which is transmitted to the SGSN through the PCU.

The GPRS uses a physical channel called a temporary block flow (TBF) for data transmission between the terminal and a network. The TBF is set when there is an LLC PDU transmission request by an upper layer of the terminal in a packet idle mode. When the TBF is set, the terminal is switched to a packet transfer mode.

The LLC PDU transmission service is provided in an RLC acknowledged mode and an RLC unacknowledged mode, and when the LLC PDU transmission in uplink and downlink directions is terminated, the corresponding TBF is released. As the TBF is released in the packet transfer mode, the terminal returns to the packet idle mode.

FIG. 1 shows a protocol layer adopted in the GPRS system. As shown, a data link layer consists of a logical link control (LLC), radio link control (RLC), and medium access control (MAC) sub-layers. These sub-layers provide a service on an upper layer protocol and receives a service from a physical layer. The LLC sub-layer provides a logical channel ensuring reliability between two peer entities, while the RLC sub-layer positioned below the LLC sub-layer segments a to-be-transmitted LLC protocol data unit (PDU) to RLC/MAC block and reassembles received RLC/MAC block. The MAC sub-layer positioned below the RLC sub-layer allows a plurality of mobile terminals to share a physical channel.

The RLC/MAC block is classified into an RLC data block and an RLC/MAC control block in the acknowledged mode. The RLC/MAC control block has priority over the RLC data block. The RLC/MAC block consists of an MAC header and an RLC data block which includes an RLC header, an RLC data unit, and spare bits.

FIG. 2 shows a format of an uplink RLC data block containing an MAC header adopted for the GPRS system in accordance with a related art. The MAC header consists of a payload type field indicative of a type of data carried in the RLC/MAC block, a countdown value field indicative of a countdown value (CV) that the terminal transmits in order for a network to calculate the current number of RLC data blocks remaining for the uplink TBF, a stall indicator (SI) bit indicative of whether an RLC transmission window of the terminal can advance, and a retry (R) bit indicative of whether the terminal has transmitted a CHANNEL REQUEST message or a PACKET CHANNEL REQUEST message more than once during the latest channel access.

An uplink RLC data block includes a spare bit set to '0', an PFI indicator (PI) indicative of whether there is a packet flow identifier (PFI), an optional item, a TLLI indicator (TI) bit indicative of whether there is a temporary flow identity (TFI) field for checking a TBF where the RLC data block belongs or whether there is a TLLI field, an optional item, a BSN field indicative of a block sequence number (BSN), a length indicator (LI) for determining a boundary of LLC PDUs of the RLC data block, a more (M) bit indicative of whether there is a following LLC PDU in the RLC data block, and an extension (E) bit indicative of whether there is an optional octet in the RLC PDU.

In the uplink TBF operation process, the terminal transmits the RLC/MAC block through each allocated uplink data block, and the network sends a PACKET UPLINK ACK/NAK message to the terminal as necessary. If a transmission status variable V(S) is equal to the sum of an acknowledge state variable V(A) and a transmit window size (WS) modulo SNS (that is, V(S)=V(A)+WS modulo SNS), the terminal judges that the transmit window is in a stall state. Then, the terminal sets stall indicators (SI) of every transmitted uplink RLC block to '1' so as to inform the network of the stall state until the transmit window gets out of the stall state.

However, in the case that the terminal informs the network of the stall state using the following data blocks after the transmit window is in stall state, the terminal keeps re-transmitting the RLC data blocks which have not been acknowledged from the network until it receives a PACKET UPLINK ACK/NACK message from the network and gets out of the stall, and if the stall state is prolonged, radio resources are wasted.

The above references are incorporated bit reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter Another object of the present invention is to provide a data transmission control method which minimizes waste of common resources relating to RLC data block re-transmission by estimating a possibility that a transmit window of a terminal is in stall and informing a network in advance before its occurrence.

To achieve at least the above objects in whole or in parts, there is provided a data transmission method of a GPRS including: estimating a possibility that a transmit window is stalled; transmitting a stall state alarm signal to a network if it is estimated that the transmit window will enter the stall state; and controlling a data transmission according to whether or not an ACK signal for the stall state alarm signal is received from the network.

The transmit window's entering into stall occurs when a send state variable V(S) is equal to the sum of an acknowledge state variable V(A) and a transmission window size (WS) modulo SNS (sequence number space).

In the step of transmitting the stall state alarm signal, a first stall state alarm signal is transmitted, it is judged whether an ACK for the first stall state alarm signal has been received, and if the ACK for the first stall state alarm signal is received by a predetermined time point, the network is informed of reception of the ACK for the first stall state alarm signal, and the transmit window is updated according to the received ACK signal.

If the ACK for the first stall state alarm signal is not received by the predetermined time point, a second stall state alarm signal is transmitted, it is judged whether an ACK for the second stall state alarm signal has been received before the transmit window is stalled, and if the ACK for the second stall state alarm signal has been received, the network is informed of the reception of the ACK for the second stall state alarm signal, and the transmit window is updated accordingly to the received ACK signal.

If, however, no ACK is received for the second stall state alarm signal, the network is informed that the transmit window is stalled and a re-transmission procedure is performed.

The first stall state alarm signal is transmitted when there remain RLC/MAC blocks to be transmitted which are as many as double the assigned uplink time slots until the transmit window is stalled, while the second stall state alarm signal is transmitted when there remain RLC/MAC blocks to be transmitted which are as many as assigned uplink time slots until the transmit window is stalled without receiving an ACK for the first stall state alarm signal.

The stall state alarm signal of the transmit window is determined depending on setting of a RLC Transmit Stall Alarm (RTSA) field of the RLC data block. An RTSA field of the RLC data block corresponding to the first stall state alarm signal is set to '01', while a RTSA field of the RLC data block corresponding to the second stall state alarm signal is set to '10'.

An RTSA field of the first RLC data block transmitted after receiving an ACK for the first and second stall state alarm signal is set to '11', and a RTSA field of the following RLC data block is set to '00'.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

A data transmission method in accordance with the present invention will now be described by taking an example of channel allocation in a multislot class 12 terminal supporting a multi-time slot. A GPRS radio frame consists of 8 time slots. Each uplink and downlink allocation available number of the class 12 terminal is 4, and the sum of maximum uplink and downlink is 5. An uplink frame starts later by 3 time slots than a downlink frame in consideration of a propagation delay.

Figure 1:
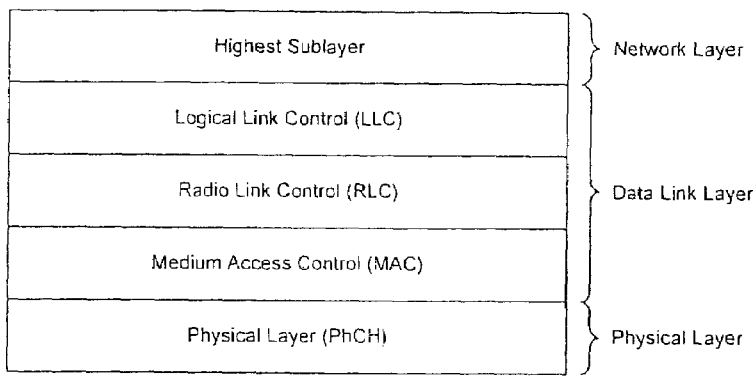
FIG. 1 is a drawing illustrating a protocol layer adopted for a GPRS system.
Figure 2:
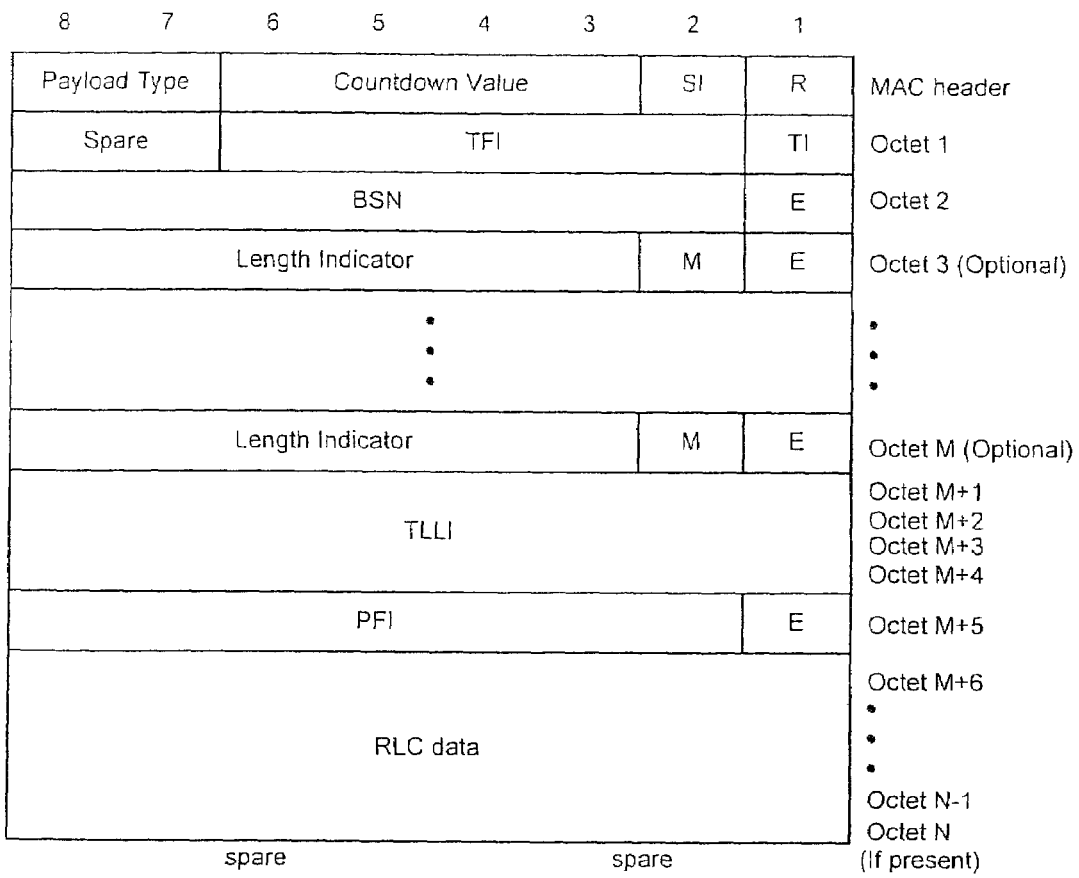
FIG. 2 is a drawing illustrating a format of an uplink RLC data block containing a MAC header in accordance with the related art.
Figure 3:
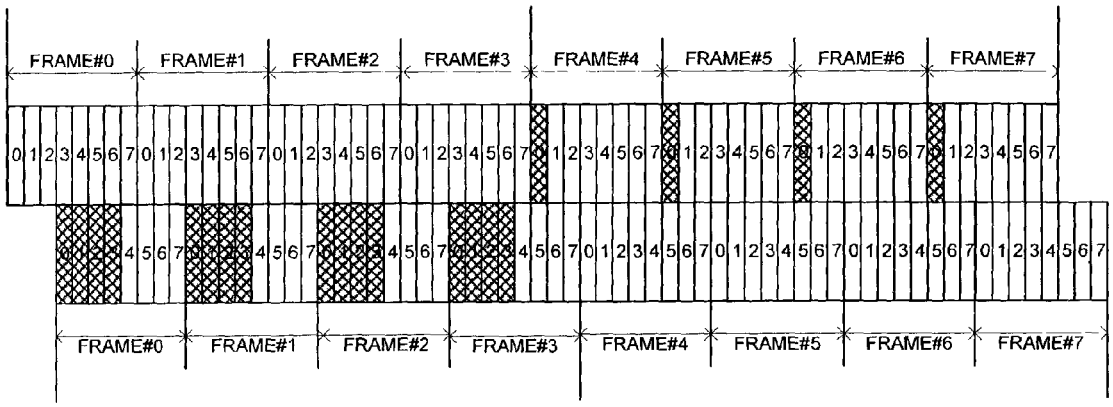
FIG. 3 is a drawing illustrating a frame structure of uplink and downlink channels allocated to a multislot class 12 terminal.

FIG. 3 shows a frame structure of uplink and downlink channels allocated to the multislot class 12 terminal. As shown, there is allocated four uplink time slots TS0, TS1, TS2, and TS3 (block period) and one downlink time slot TS0 per frame. The terminal transmits the RLC data block to the network through the uplink time slots TS0, TS1, TS2 and TS3. After the RLC data block is transmitted as much as the transmit window (WS), the terminal receives a packet uplink ACK/NACK message through the downlink time slot TS0.

In this process, if the transmit window (WS) is checked to be in a stall state, the terminal sets an SI bit of the uplink RLC data block as '1' and informs the network that the RLC transmit window of the terminal is in the stall state. If the transmit window is not in the stall state, the SI bit is set to '0'.

When the send state variable V(S) of the terminal is equal to the sum of an acknowledge state variable V(A), which indicates a BSN value of the oldest RLC data block negatively received from the network, and the WS modulo SNS (sequence number space) 128 (that is, if V(S)=V(A)+WS modulo SNS), the terminal judges that the transmit window is in the stall state. V(S), which is a sequence number of the RLC data block to be transmitted next, has a value of SNS-1 at '0'. When TBF starts, V(S) starts from '0' and is increased by 1 together with BSN (block sequence number) whenever the RLC data block is transmitted.

The acknowledge state variable V(A) provides an index with respect to an acknowledge state array V(B) modulo SNS, which is updated by a value of a received block bitmap (RBB) of the packet uplink ACK/NACK message received from the network. The acknowledge state array V(B) is an array of SNS factors informing the acknowledge state of the transmit window size (WS). The RBB is a binary value array of the WS factors.

If the transmit window is judged to be in the stall state, the terminal transmits the oldest RLC data block having a factor with a PENDING_ACK value in the V(B) (that is, a value of a factor corresponding to a pertinent RLC data block in the V(B) set when each RLC data block is transmitted), and then subsequently transmits the second-oldest RLC data block. After every RLC data block having a corresponding factor with the PENDING_ACK value in V(B) is transmitted, the terminal repeats transmission from the oldest RLC data block in the same manner. The procedure of transmitting the oldest RLC data block having the corresponding factor with the PENDING_ACK value in V(B) continues until V(S)=V(A)+WS modulo SNS is released.

Accordingly, if the packet uplink ACK/NACK value received from the network is negative or if no packet uplink ACK/NACK message is received, the transmit window is held in the stall state so that re-transmission of the oldest RLC data block having the corresponding factor with the PENDING_ACK value in V(B) is repeated to waste the common resource.

The present invention is directed to minimizing waste of the common resource according to re-transmission by allowing the terminal to predict the stall state and then informing the network in advance before the transmit window is stalled.

Figure 4:
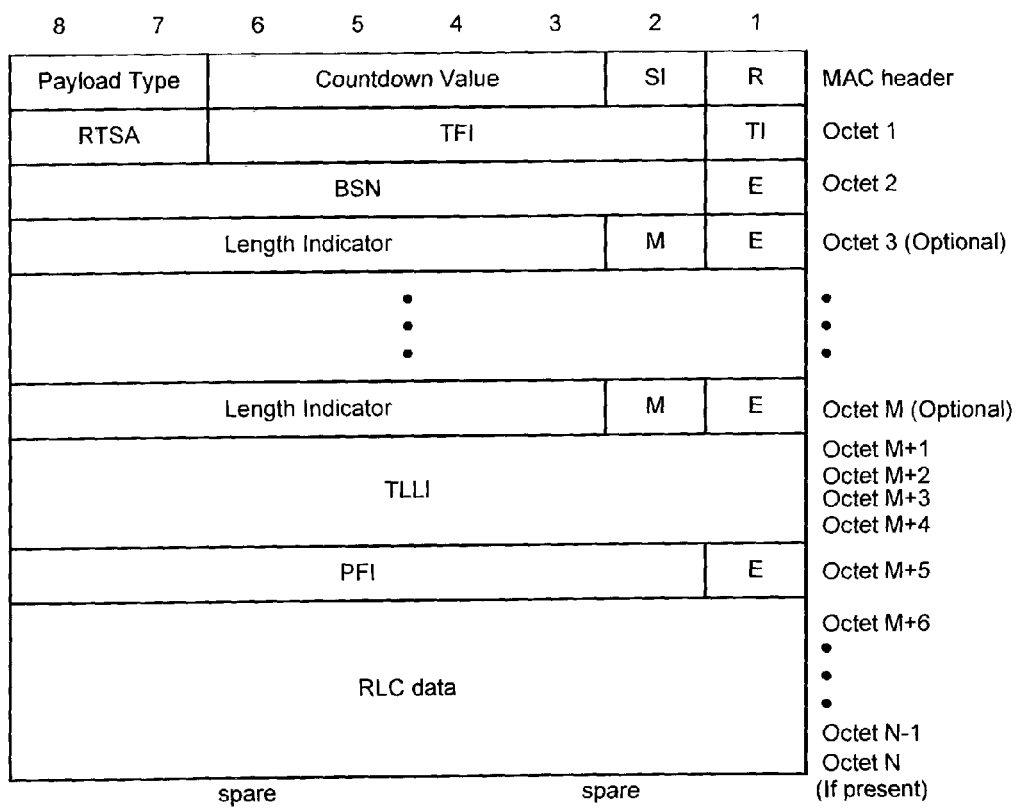
FIG. 4 is a drawing illustrating a format of an uplink RLC data block containing a MAC header adopted for a data transmission method in accordance with a preferred embodiment of the present invention.

FIG. 4 shows a format of an uplink RLC data block containing an MCA header adapted for a data transmission method in accordance with a preferred embodiment of the present invention. The uplink RLC data block preferably uses the spare bits in the uplink RLC data block of the related art to RLC transmit stall alarm (RTSA) bits. Alternatively, the stall alarm bits may be included in other portions or fields of the RLC data block, and/or as new bits appended to the data block.

In the data transmission method of the present invention, the terminal predicts a stall condition of the window before the transmit window actually stalls, informs the network accordingly using the RTSA bits of the uplink RLC data block, and requests a packet uplink ACK/NACK message. The terminal's packet uplink ACK/NACK message request maybe attempted before the transmit window is stalled.

More specifically, the terminal transmits the RLC/MAC block with RTSA bits set to '01' to the network when there remains RLC/MAC blocks as many as double the number of allocated uplink timeslots until the transmit window is stalled. When the packet uplink ACK/NACK message is received from the network in response to the first RTSA bits, the terminal transmits the RLC/MAC block with RTSA bits set to '11' to the network to inform that the packet uplink ACK/NACK message has been received.

Meanwhile, if no packet uplink ACK/NACK message is received for the first RTSA bits from the network, the terminal transmits the RLC/MAC block with RTSA bits set to '10' to the network when there remains RLC/MAC blocks as many as the number of allocated uplink timeslots until the transmit window is stalled.

If the packet uplink ACK/NACK message is received from the network in response to the second RTSA bits, the terminal transmits the RLC/MAC block with RTSA bits set to '11' to the network to inform of its reception of the packet uplink ACK/NACK. If, however, no packet uplink ACK/NACK message is received for the second RTSA bits from the network, the transmit window is stalled.

Table 1 defines each value of RTSA bits.

TABLE 1

| RTSA bits | |
|---|---|
| 00 | None valid |
| 01 | Request Packet uplink ACK/NACK (1st) |
| 10 | Request Packet uplink ACK/NACK (2nd) |
| 11 | Received Packet uplink ACK/NACK |

Figure 5:
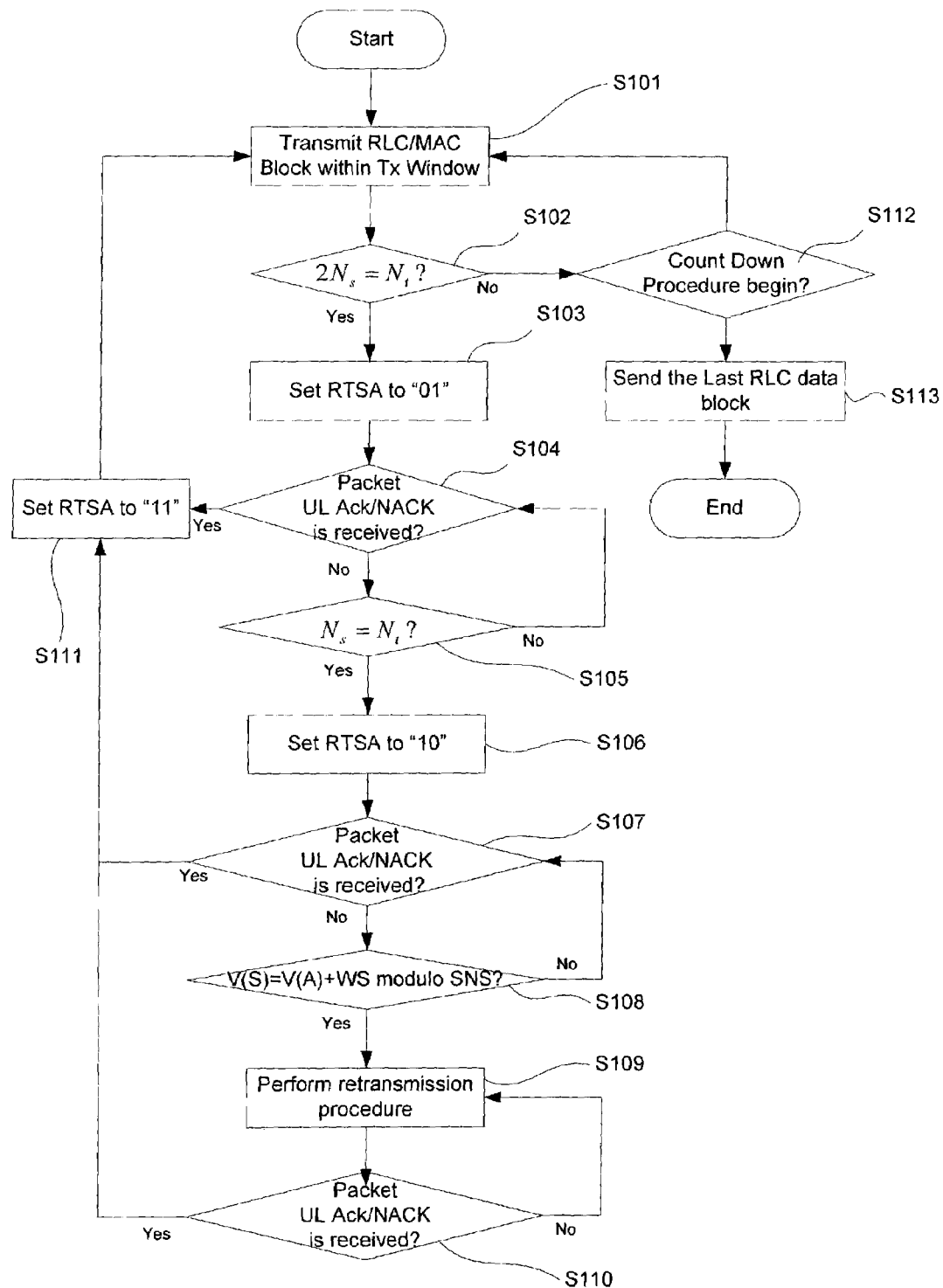
FIG. 5 is a flow chart of a data transmission control method in a GPRS in accordance with the present invention

FIG. 5 shows steps included in a data transmission control method in a GPRS in accordance with one embodiment of the present invention. When an uplink TBF is set in an RLC acknowledged mode, the terminal transmits the RLC/MAC block within the transmit window through each allocated uplink data block (step S101). While transmitting the RLC/MAC block, the terminal monitors $N_s$, the number of RLC/MAC blocks corresponding to the number of allocated ULTSs, and judges whether it satisfies the condition of $2N_s=N_t$ (step S102).

If the condition $2N_s=N_t$ is satisfied, the terminal sets RTSA bits of the transmitted RLC data block to '01', requests a packet UL ACK/NACK from the network (first packet UL ACK/NACK request) (step S103), and waits for a packet UL ACK/NACK message from the network in response (step S104).

When the terminal receives the packet UL ACK/NACK from the network in response to the first packet UL ACK/NACK request, the terminal sets RTSA bits to '11' and informs the network of the reception of the packet UL ACK/NACK, and then, sets RTSA bits to '00' for the following RLC data block.

Meanwhile, if no packet UL ACK/NACK is received from the network for the first packet UL ACK/NACK request, the terminal judges whether the condition $N_s=N_t$ (step S105) is satisfied. If this condition is satisfied, the terminal sets RTSA bits of the RLC data block to '10' and requests a packet UL ACK/NACK from the network (second packet UL ACK/NACK request) (step S106) and waits for the packet UL ACK/NACK message from the network in response (step S107).

When the packet UL ACK/NACK message is received from the network in response to the second packet UL ACK/NACK request, the terminal sets RTSA bits to '11' and informs the network of the reception of the packet UL ACK/NACK, and then, sets RTSA bits to '00' for the following RLC data block (step S111).

If, however, no packet UL ACK/NACK is received from the network for the second packet UL ACK/NACK request, the terminal judges whether the transmit window has reached a stall state (step S108), and if so the terminal performs the re-transmission procedure.

During the re-transmission procedure, the terminal monitors reception of the packet UL ACK/NACK. When the terminal receives the packet UL ACK/NACK message, it sets RTSA bits to '11' and informs the network of the reception of the packet UL ACK/NACK, and then, sets RTSA bits to '00' for the following RLC data block (step S111).

Meanwhile, in step S102, if the condition $2N_s=N_t$ is not satisfied, the terminal judges whether a count down procedure has started. If the count down procedure has not yet started, the terminal keeps transmission of the RLC/MAC within the transmit window. Then, when the count down procedure starts, the terminal transmits the final RLC data block (step S113) and releases the uplink TBF.

As so far described, the data transmission method in accordance with the present invention has the following advantages. The possibility that the transmit window is stalled is informed to the network twice before its occurrence, so that the number of occurrences of the transmit window's stall state can be reduce. As a result, waste of network resources due to re-transmission performed in the stall state can be minimized.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A data transmission method, comprising:
   comparing a number of data blocks to be transmitted to a number of allocated time slots that are in a radio frame until a stall state entrance of a transmit window occurs;
   predicting the stall state entrance of a transmit window before the stall state entrance occurs based on the comparison;
   setting a field of a data block to a value corresponding to a first stall state alarm signal based on the prediction;

transmitting the data block containing said value to a network before the stall state entrance occurs, said value indicative of the predicted stall state; and controlling a data transmission based on whether a feedback signal is received from the network in response to the first stall state alarm signal, wherein said controlling further comprises:

transmitting a data block with a value corresponding to a second stall state alarm signal before the stall state entrance occurs; and controlling the data transmission based on whether a feedback signal is received from the network in response to the second stall state alarm signal, wherein the data block containing said value corresponding to the second stall state alarm signal is transmitted when no message is received from the network in response to the data block transmitted with the value corresponding to the first stall state alarm signal.

2. The method of claim 1, wherein the data block containing said value corresponding to the first stall state alarm signal is transmitted when a number (Nt) of RLC data blocks to be transmitted is two times of a number (Ns) of the RLC data blocks corresponding to a number of time slots allocated until the transmit window is stalled (Nt=2Ns).

3. The method of claim 2, wherein the data block containing said value corresponding to the second stall state alarm signal is transmitted when the number of RLC Data Blocks to be transmitted is equal to a number of the RLC data blocks corresponding to the number of time slots allocated until the transmit window is stalled (Nt=Ns).

4. The method of claim 1, wherein said values corresponding to the first or second stall state alarm signals are set in RLC Transmit Stall Alarm (RTSA) fields of corresponding ones of RLC data blocks to be transmitted.

5. The method of claim 1, wherein transmitting the data block containing said value corresponding to the first stall state alarm signal includes:

determining whether or not an acknowledgement signal is received in response to the data block containing said value corresponding to the first stall state alarm signal before a predetermined time;

transmitting a data block containing a value informing the network of reception of the acknowledgement signal for the first stall state alarm signal upon reception of the acknowledgement; and updating the transmit window according to the acknowledgement signal.

6. The method of claim 1, wherein transmitting the data block containing said value corresponding to the second stall state alarm signal includes:

determining whether or not an acknowledgement signal is received in response to the data block containing said value corresponding to second stall state alarm signal before the transmit window is stalled;

transmitting a data block containing a value informing the network of reception of the acknowledgement signal for the second stall state alarm signal upon reception of the second stall state alarm signal; and updating the transmit window according to the acknowledgement signal.

7. The method of claim 6, wherein if no acknowledgement signal is received in response to the second stall state alarm signal, the transmit window entered in a stall state.

8. A method for managing data communications, comprising:

detecting that a number of data blocks to be transmitted is a predetermined number of times greater than a number of allocated time slots that are in a radio frame until a stall condition of data transmission window occurs;

predicting the stall condition of the data transmission window; and notifying a network element of the predicted stall condition before the stall occurs, wherein said notifying includes:

setting information indicative of the predicted stall condition in a predetermined field of a first RLC data block; and transmitting the first RLC data block including said information from a terminal to the network element through an uplink channel, the information set in an RLC Transmit Stall Alarm (RTSA) field of the first RLC data block corresponding to a first stall state alarm signal, wherein the notifying further includes:

setting information in a second RLC data block indicative of the predicted stall condition; and transmitting the second RLC data block to the network element before the stall condition occurs, the information set in the second RLC corresponding to a second stall state alarm signal and the second RLC data block transmitted when a number of RLC data blocks to be transmitted equals the number of allocated time slots until the transmission window stalls.

9. The method of claim 8, wherein said predetermined number of times is a multiple of a number of allocated uplink time slots until the transmission window stalls.

10. The method of claim 8, wherein said predetermined number of times is one.

11. The method of claim 8, wherein said predetermined number of times is two.

12. The method of claim 8, wherein the predetermined field is an RTSA field of the first RLC data block.

13. The method of claim 8, wherein the information set in the predetermined field of the first RLC data block serves as a request for a packet uplink acknowledgment/non-acknowledgment message from the network element before the transmit window stalls, and wherein said method further includes controlling data transmission based on whether a feedback signal is received from the network element in response to the request.

14. The method of claim 8, wherein the set information corresponds to a first stall state alarm signal to the network element.

15. The method of claim 1, wherein said value in the data block corresponding to the first stall state alarm signal corresponds to a first request for the network to transmit a message acknowledging receipt of the data block containing said value corresponding to the first stall state alarm signal.

16. The method of claim 15, wherein said value in the data block corresponding to the second stall state alarm signal corresponds to a second request for the network to transmit a message acknowledging receipt of the data block containing said value corresponding to the second stall state alarm signal.

17. The method of claim 1, wherein said values in the data blocks corresponding respectively to the first and second stall state alarm signals are a same value.

18. The method of claim 1, wherein the data block containing said value corresponding to the first stall state alarm signal is transmitted upon detection of a first condition and the data block containing said value corresponding to the second stall state alarm signal is transmitted upon detection of a second condition different from the first condition.

19. The method of claim 18, wherein the first condition corresponds to the number of data blocks to be transmitted being a first predetermined number of times greater than the number of transmission time slots in the radio frame, and wherein the second condition corresponds to the number of data blocks to be transmitted being a second predetermined number of times greater than the number of transmission time slots in the radio frame, wherein the first and second predetermined numbers of time slots are different.

* * * * *